United States Patent
Dean (10) Patent No.: US 6,441,783 B1
(45) Date of Patent: Aug. 27, 2002

(54) CIRCUIT MODULE FOR A PHASED ARRAY

(75) Inventor: Michael Dean, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/413,809

(22) Filed: Oct. 7, 1999

Related U.S. Application Data (63) Continuation of application No. 08/981,582, filed as application No. PCT/GB95/01607 on Jul. 7, 1995, now Pat. No. 6,054,948.

(51) Int. Cl.[7] ............................ H01Q 3/22; H01Q 3/24; H01Q 3/26
(52) U.S. Cl. ......................................... 342/372; 342/81
(58) Field of Search .................... 342/372, 81, 150, 342/154

(56) References Cited

U.S. PATENT DOCUMENTS

| | | |
|---|---|---|
| 4,201,986 A | 5/1980 | Ducrocq |
| 4,749,995 A | 6/1988 | Hopwood et al. |
| 4,791,421 A | 12/1988 | Morse et al. |
| 4,961,062 A * | 10/1990 | Wendler ...................... 333/164 |
| 4,967,201 A * | 10/1990 | Rich, III ...................... 342/175 |
| 4,970,519 A | 11/1990 | Minnis et al. |
| 5,019,793 A | 5/1991 | McNab |
| 5,061,937 A | 10/1991 | Ozeki et al. |
| 5,093,667 A * | 3/1992 | Andricos ...................... 342/372 |
| 5,303,240 A | 4/1994 | Borras et al. |
| 5,311,190 A | 5/1994 | Devendorf et al. |
| 5,353,031 A | 10/1994 | Rathi |
| 5,412,414 A | 5/1995 | Ast et al. |
| 5,446,464 A | 8/1995 | Feldle |
| 5,909,191 A * | 6/1999 | Hirshfield et al. .......... 342/174 |

FOREIGN PATENT DOCUMENTS

| | | |
|---|---|---|
| WO | WO 93 16396 | 8/1993 |

OTHER PUBLICATIONS

Bugeau et al., Advanced MMIC T/R Module for 6 to 18 GHz Multifunction Arrays, 1992 IEEE MTT–S International Microwave Symposium Digest, Jun. 1, 1992, pp. 81–84.

Garrod, Adrian, "Digital Modules for Phased Array Radar", IEEE 1995 International Radar Conference, May 8, 1995, pp. 726–731.

* cited by examiner

Primary Examiner—Theodore M. Blum
(74) Attorney, Agent, or Firm—Nixon & Vanderhye P.C.

(57) ABSTRACT

A circuit module for a phased array (10) incorporates radio frequency (RF) mixers (54a, 54b) connected to an RF splitter/combiner (52) and to in-phase and quadrature RF reference signals. The RF mixers (54a, 54b) are also connected to intermediate frequency (IF) processing circuitry (60 to 68) providing for phase control of RF signals and IF reference signals. In transmission mode, the RF mixer (54a, 54b) receive phase-controlled, digitally synthesised IF signals from clock-activated generators (68a, 68b). Their outputs are combined at the RF splitter/combiner (52) to provide single sideband upconversion of the phase-controlled IF signals. In reception mode, the RF splitter/combiner (52) and the RF mixers (54a, 54b) act as an image rejection mixer circuit in which the phase-controlled IF signals are local oscillator signals. Beamforming is carried out by computer control of the IF phase together with, in the case of reception, analogue or digital summation of output signals from an array of modules (12).

2 Claims, 10 Drawing Sheets

CIRCUIT MODULE FOR A PHASED ARRAY

This is a continuation of application Ser. No. 08/981,582, filed Dec. 10, 1997, now U.S. Pat No. 6,054,948 which is a national phase entry of PCT/GB95/01607 filed Jul. 7, 1995, the entire content of which is hereby incorporate by reference in this application.

BACKGROUND OF THE INVENTION

1. Field of the Invention

This invention relates to a circuit module for a phased array.

2. Discussion of Prior Art

Phased arrays have been under development for over twenty years to overcome the problems of mechanically scanned radars. An example of the latter typically employs a reflecting dish antenna rotated by a servomotor. Both antenna and servomotor are costly and cumbersome; the maximum beam scan rate is limited by the inertia and limited motor power of the antenna assembly.

In a phased array radar system, beamsteering or beamforming, ie control of the radar transmission or reception direction, is electronic instead of mechanical. Such a system consists of an array of antenna elements each connected to radar signal generation and reception circuitry. Each antenna element radiates when supplied with radar frequency (RF) power, and responds to incident radiation of appropriate frequency by producing a received signal. Received signals are downconverted to intermediate frequency (IF) by mixing with a local oscillator (LO) signal; ie, conventional superheterodyne detection is employed. In transmission, the output radar beam direction is controlled by the phase relationship between the RF drive signals to individual antenna elements in the array. If the drive signals are all in phase with one another, the output beam direction is perpendicular to the phased array ("on boresight") in the case of a planar system. If the drive signal phase varies linearly with antenna element position across the array, the output beam is inclined at an angle to the array boresight. Altering the rate at which phase varies with position alters the output beam inclination and provides the received signal phase as a function of array position. This may be achieved by varying the LO phase across the array, or by inserting differing delays into received signal paths. In both reception and transmission, control of signal phase at each individual array element is a prerequisite to a viable phased array radar. Conventional phase shifters employ switched lengths of transmission line, ferrite devices or switched networks of inductors and capacitors. They are bulky, costly and imperfect.

The development of phased array radars has been inhibited by the conflicting requirements of phase control and the need to increase radar frequency and power. It is desirable to employ a frequency which is as high as possible in order to reduce antenna size for a given angular resolution, which is inversely proportional to frequency. However, as the radar frequency increases, the cost of radar signal sources increases and power available is reduced. Moreover, the cost of electronic components suitable for the higher frequencies increases greatly and their availability deteriorates. Silicon integrated circuits for example are unsuitable for use at GHz frequencies at which state of the art phased arrays are required to operate. This has led to the development of GaAs monolithic microwave integrated circuits (MMIC) for operation at GHz frequencies.

The present design philosophy for phased arrays is that each antenna element be furnished with a respective transmit/receive circuit module, as described by Wisseman et al in Microwave Journal September 1987 pages 167–172. This module incorporates a phase shifter for phase control, a transmission power amplifier and a low noise amplifier for received signals. It is for use at frequencies well above 1 GHz, and consists of a GaAs chip with dimensions 13.0× 4.5×0.15 mm. The phase shifter is an analogue electronic circuit providing a choice of sixteen phase angles selectable by switches, controlled by a 4 bit digital input. More than half of the area of the chip is devoted to the phase shifter, which is therefore responsible for a substantial proportion of the chip cost, failure rate and production faults. Chips of this kind are characterised by very high cost and low yield.

It is possible to avoid using individual phase shifters in a phased array operating in reception mode. This approach involves conventional frequency downconversion of individual antenna signals followed by digitisation and processing of the digital signals in a computer. The computer multiplies the digital signals by respective weighting factors, and sums the products so formed to produce a result corresponding to receive beamforming. There is however no equivalent of this procedure for the transmission mode.

In an attempt to ameliorate the problem of achieving controllable phase shifting, the technique of direct digital synthesis of analogue RF waveforms has been developed. This technique is described by R J Zavrel, in RF Design, March 1988, pages 27 to 31. It involves storing required analogue waveforms as set of digital numbers within a memory, and reading out the numbers in succession at a rate appropriate to the chosen frequency. A stream of digital numbers results which is fed to a digital to analogue converter. The converter output is the required waveform. Change of phase can be accomplished merely by change of start address. This approach is considerably more convenient than employing analogue phase shifter circuits. It also has the great advantage of sufficient flexibility to compensate for errors introduced by inaccuracies arising elsewhere in a phased array system. For example, a phase shift introduced by a single array module amplifier might be detected in a calibration operation. It would be compensated by a phase shift applied in that module by changing a start address.

However, direct digital synthesis suffers from the drawback that the highest frequencies that can be generated at present are more that a factor of ten below those required for a compact phased array radar. The latter requires transmission frequencies of several GHz or more, whereas digital synthesis is restricted to frequencies of hundreds of MHz. In consequence, and despite their disadvantages, analogue phase shifter circuits operating at radar frequencies are still employed in phased array transmission mode in state of the art devices such as that described by Wisseman et al.

SUMMARY OF THE INVENTION

It is an object of the invention to provide a circuit module for a phased array which does not require an RF analogue phase shifter.

The present invention provides a circuit module for a phased array, the module including downconversion means for converting radar frequency (RF) received signals to intermediate frequency (IF) and beamforming means for configuring radar reception beams when associated with other like modules, characterised in that the beamforming means comprises local oscillator (LO) signal generating means arranged to produce LO signals at IF with digitally controlled phase and IF mixing means arranged to mix LO signals with IF signals.

The invention provides the advantage that it does not require an RF analogue phase shifter to effect beamforming. Phase control is accomplished digitally at IF, which enables low cost techniques to be employed which would be inappropriate at RF. As will be described in detail later, this provides for the invention to be susceptible to construction in relatively inexpensive form using commercially available mass-produced components.

In one embodiment the module of the invention is arranged for operation in both reception and transmission modes, the downconversion means being reversible and arranged as an image rejection mixer in reception mode and also as a single sideband upconverter in transmission mode to combine RF signals with phase control signals produced by the LO signal generating means. In this embodiment the module may include switching means arranged to define transmission and reception signal paths. It may also include two amplifiers arranged for amplification of signals to be transmitted and received signals respectively and each having an output connected to an input the other. The use of reversible downconversion means considerably reduces the amount of circuitry required in a phased array module as compared to the prior art.

The module may include a plurality of like LO signal generating means and IF mixing means for configuration of a plurality of beams. The IF mixing means may be connected to analogue summing means arranged for the formation of radar reception beams by summing analogue signals derived from mixing of LO and IF signals in a plurality of like modules.

The LO signal generating means may be arranged for direct digital synthesis of LO signals. It may alternatively be arranged to receive an analogue IF reference signal and two digital phase control signals and to produce a phase controlled LO signal therefrom. In this second alternative, the LO signal generating means may incorporate a control bus for supply of digital phase control signals, digital to analogue converting means for converting the digital phase control signals to analogue voltages, and a silicon vector modulator integrated circuit for producing a phase controlled LO signal in response to input of the IF reference signal and the digital phase control signals.

The downconversion means incorporated in the module may comprise an integrated circuit incorporating an RF amplifier and an RF mixer.

The module of the invention may be a receiver module for use in a phased array of like receiver modules in association with a separate array of transmitter modules, and wherein the LO signal generating means incorporates means for supply of digital phase control signals, digital to analogue converting means for converting the digital phase control signals to analogue voltages, and a silicon vector modulator integrated circuit for producing a phase controlled LO signal in response to input of an IF reference signal and the digital phase control signals, and wherein also each transmitter module comprises a control bus for supply of digital phase control signals, digital to analogue converting means for converting the digital phase control signals to analogue voltages, a silicon vector modulator integrated circuit for producing a phase controlled IF signal in response to input of an IF reference signal and the digital phase control signals and mixing means for mixing the phase controlled IF signal with an RF reference signal to provide a radar transmission signal.

In a preferred embodiment, the module of the invention comprises a plurality of like LO signal generating means and IF mixing means for configuration of a plurality of beams.

BRIEF DESCRIPTION OF THE INVENTION

In order that the invention might be more fully understood. embodiments thereof will now be described, by way of example only, with reference to the accompanying drawings, in which.

DETAILED DISCUSSION OF PREFERRED EMBODIMENTS

Figure 1:
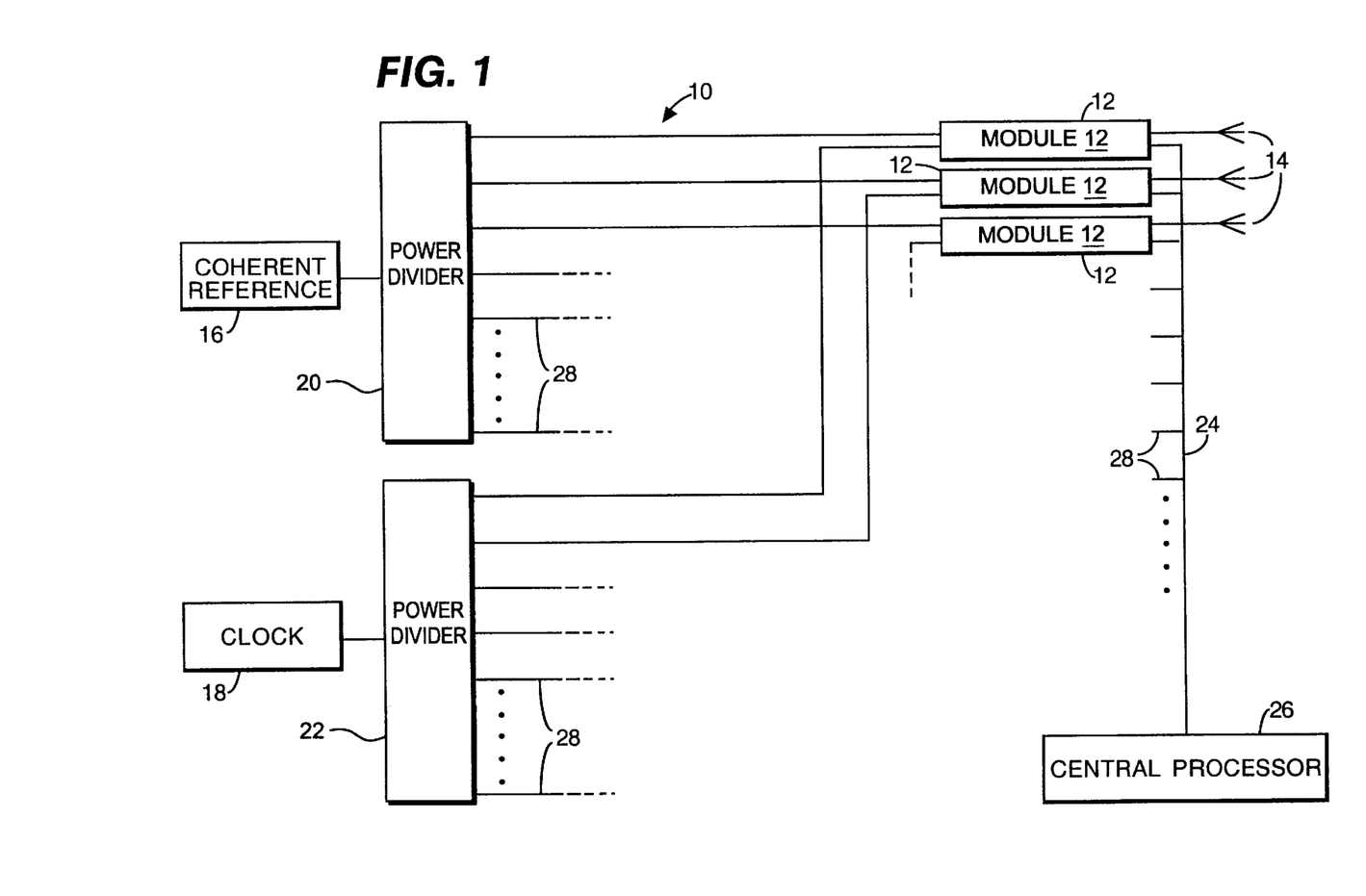
FIG. 1 is a block diagram of a phased array radar device.

Referring to FIG. 1, there is shown a schematic block diagram of the electronic circuitry of a phased array radar device indicated generally by 10. The device 10 comprises a number of individual electronic modules 12 each with a respective antenna radiating element 14. The modules 12 and antennas 14 are of like construction, and in some embodiments each antenna 14 may be mounted on the circuit board (not shown) of its associated module 12. The antennas 14 (of which three are shown) are arranged to form a planar array.

A coherent reference signal generator 16 and a clock signal generator 18 are connected via respective power dividers 20 and 22 to each of the modules 12. Output signals from the modules 12 pass via a bus 24 to a central processor 26, ie a digital computer. Only three modules 12 are illustrated explicitly, but, as indicated by discontinuous connections such as 28, the device 10 incorporates a much larger number of modules.

Figure 2:
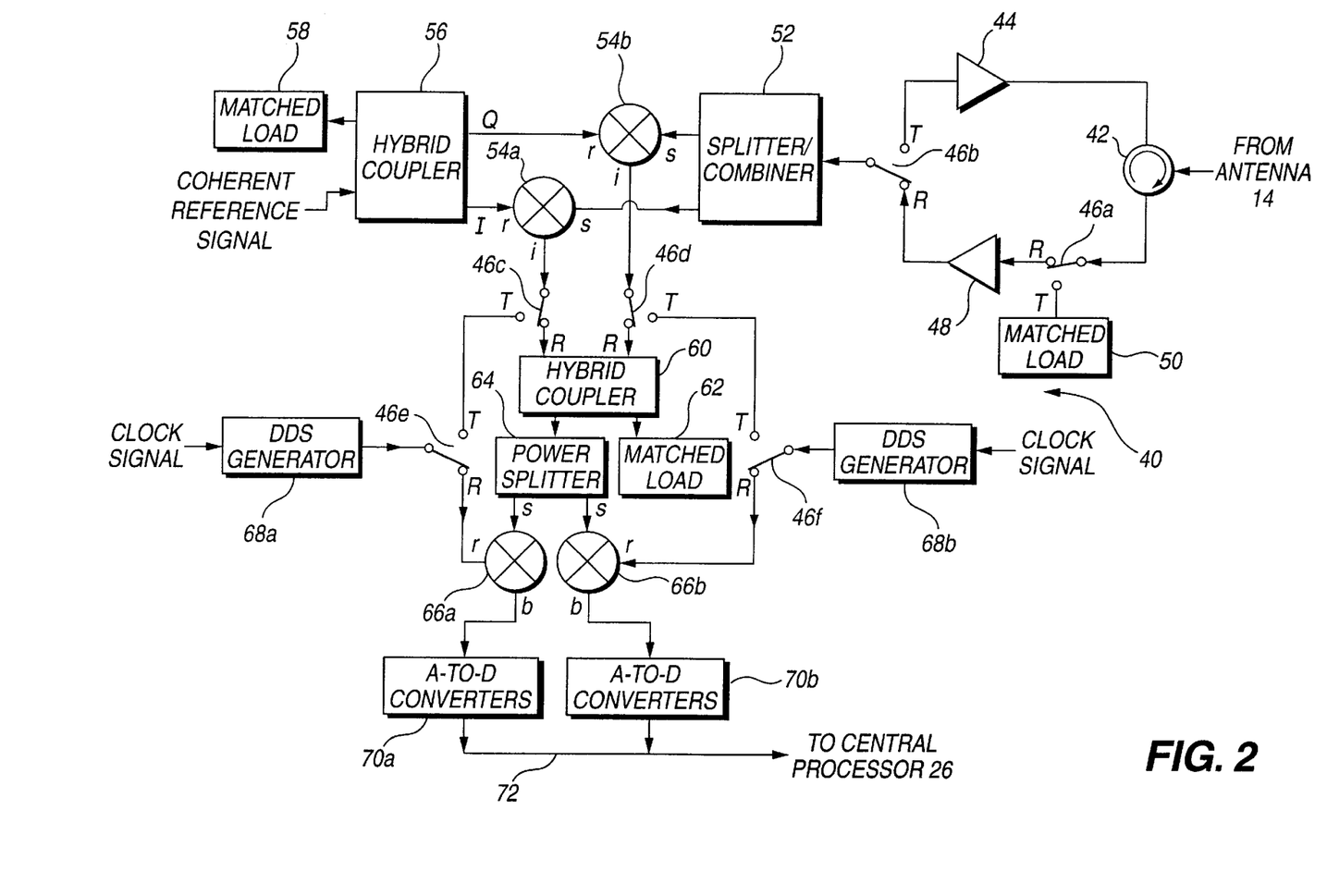
FIGS. 2 and 3 are circuit diagrams of a module of the invention shown in reception and transmission modes respectively, the module being for use in the FIG. 1 device.
Figure 3:
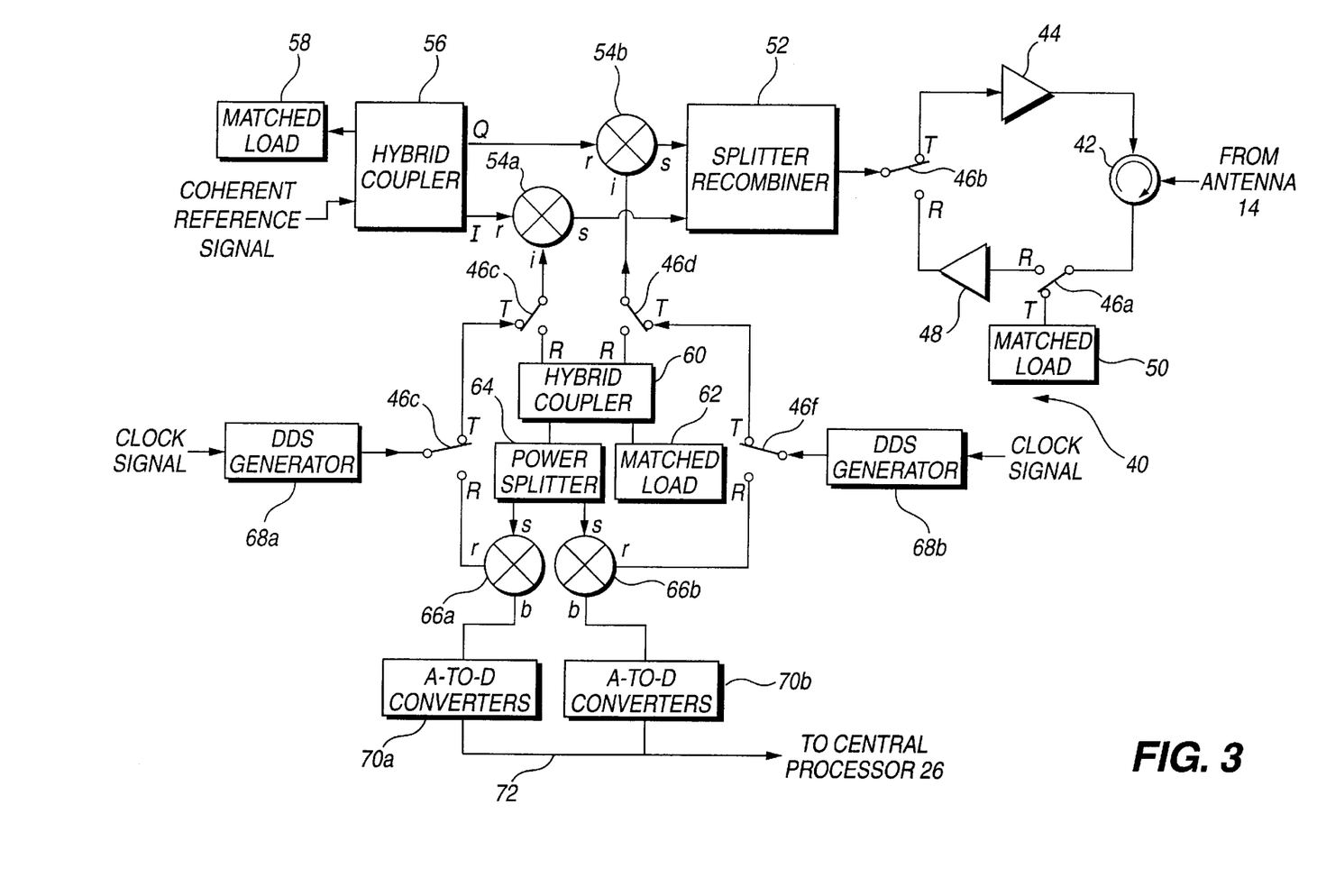

Referring now also to FIG. 2 and 3, there is shown an electronic circuit 40 of the invention for a phased array radar module 12. FIGS. 2 and 3 show the circuit 40 configured for reception and transmission respectively. The circuit 40 incorporates a circulator 42 connected to a module antenna element 14 (not shown). The circulator 42 is arranged to transmit signals from a radar frequency (RF) power amplifier 44 and to relay received signals to the pole of a first single pole, double throw (SPDT) switch 46a. The switch 46a has receive and transmit throws R and T connected to a low noise amplifier 48 and a matched load 50 respectively. The amplifiers 44 and 48 are connected to the transmit and receive throws T and R of a second SPDT switch 46b. The pole of the switch 46b is connected to an RF power splitter/combiner 52, to which RF signal input/output (I/O) ports s of two RF diode mixer circuits (mixers) 54a and 54b are also connected. A first quadrature (90°) hybrid coupler 56 is connected to reference inputs r of the mixers 54a and 54b, to a matched load 58 and to the coherent reference signal generator 16 (not shown).

The RF mixers 54a and 54b are reversible, as will be described later in more detail. They have intermediate frequency (IF) signal I/O ports i connected to third and fourth SPDT switches 46c and 46d respectively, each port i being connected to a respective switch pole. The switches 46c and 46d have transmit throws connected to transmit throws T of fifth and sixth SPDT switches 46e and 46f respectively, and receive throws R connected to a second quadrature (90°) hybrid coupler 60. The coupler 60 is connected to a matched load 62 and to an in-phase IF power splitter 64. Two IF diode mixers 66a and 66b have IF signal input ports s connected to the power splitter 64; they also have reference signal input ports r connected to receive throws R of the fifth and sixth SPDT switches 46e and 46f respectively. The switches 46e and 46f have poles connected to respective direct digital synthesis (DDS) generators 68a and 68b, these generators producing outputs derived from the clock signal generator 18 (not shown).

The IF mixers 66a and 66b have baseband outputs b connected to analogue to digital converters (ADCs) 70a and 70b respectively. Output from the ADCs 70a and 70b is fed via a digital bus 72 to the central processor 26 (not shown).

The circuit 40 operates in receive mode as follows. As illustrated in FIG. 2, all six SPDT switches 46a to 46f inclusive are set to R positions. Radar return signals received by the antenna 14 pass to the circulator 42, and are directed via the first switch 46a to the low noise amplifier 48. The amplified return signals pass via the second switch 46b to the RF splitter/combiner 52, which splits them into two equal in-phase signals for input to respective first mixers 54a and 54b. These mixers also receive in-phase (I) and quadrature (Q) reference signals respectively from the 90° hybrid coupler 56. The coupler 56 derives these signals in a conventional manner from the coherent reference signal supplied by the generator 16. Unwanted signals are absorbed in the matched load 58. The coherent reference signal is employed as a local oscillator (LO) and has a frequency designated $f_{LO}$.

Each of the mixers 54a and 54b mixes the LO reference and antenna signals on its ports r and s to provide IF signals output at i to switches 46c and 46d respectively. These IF signals pass to the second quadrature hybrid coupler, 60, which separates signals corresponding to upper and lower radar frequencies; ie, radar signals may be received by the antenna 14 at frequencies $f_{Lo}-f_{IF}$ and $f_{LO}+f_{IF}$, where $f_{IF}$ is an intermediate frequency arising from mixing at 54a/54b. The coupler 60 routes a frequency down-converted equivalent of a signal at one of these -radar frequencies to the IF splitter/combined 64, and an equivalent of the other is absorbed in the second matched load 62. It is a matter of design choice as to which signal undergoes further processing and which is rejected to the load 62. The combination of elements 52 to 64 acts as an image rejection mixer, in that one of the radar frequencies $f_{LO}\pm F_{IF}$ becomes effectively rejected.

In practice, as will be described later, only one of the radar frequencies $f_{LO}+f_{IF}$ and $f_{LO}-f_{IF}$ is in fact employed in transmission mode. There can be radar returns only at this transmission frequency. However, it is important to reject signals corresponding to the other frequency so that unwanted noise and interference from the image frequency band is suppressed.

The IF splitter/combiner 64 divides the IF signal from the hybrid coupler 60 into two equal in-phase signals for input at s to the IF mixers 66a and 66b respectively. These mixers receive r inputs of in-phase and quadrature IF reference signals produced by the DDS generators 68a and 68b and routed via switches 46e and 46f respectively. The IF mixers 66a and 68b output difference frequency signals arising from subtraction of DDS signals at IF from radar signals previously downconverted to Doppler-shifted IF. This provides to ADCs 70a and 70b in-phase and quadrature baseband (Doppler) frequency signals respectively arising from further frequency downconversion. The ADCs 70a and 70b digitise the baseband signals for onward transmission via the bus 72. The central processor 26 receives digitised signals from all the modules 12. It forms radar receive beams by summing combinations of the digitised signals from the modules 12 in a manner known in the art. Other prior art functions may also be performed, eg Doppler filtering and target detection algorithms.

The circuit 40 operates in transmission as follows. As illustrated in FIG. 3, the switches 46a to 46f are set to their T positions. This routes the clock-derived in-phase and quadrature IF reference signals from the DDS generators 68a and 68b to the RF mixers 54a and 54b respectively. The IF reference signals are mixed with the coherent reference signal at frequency $f_{LO}$ by the RF mixers, which now operate in reverse. This produces sum and difference frequencies $f_{LO}+f_{IF}$ and $f_{LO}-f_{IF}$ (upper and lower sidebands) at each of the RF mixer outputs s. The RF splitter/combiner 52 also operates in reverse to combine signals from the RF mixers 54a and 54b. However, one of the IF signals fed to the RF mixers leads the other in-phase by 90°. In consequence, signal combination in the RF splitter/combiner 52 results in the amplitude of one of the upper and lower sidebands being largely suppressed, and that of the other being augmented and transmitted to the second switch 46b. The RF mixers 54a and 54b and RF splitter/combiner 52 therefore act together in reverse as a single sideband frequency upconverter. The output of the RF splitter/combiner (consisting substantially of this single sideband) is amplified by the power amplifier 44, and is routed to the module antenna 14 by the circulator 42. Any RF power leakage from the circulator 42 to the first switch 46a is absorbed in the matched load 50, which protects the low noise amplifier 48.

The central processor 26 controls the relative signal phases applied by the DDS generators 68a and 68b of all the modules 12. It arranges for IF phases to vary with antenna position across the array 12 as required to produce phased array beam steering.

Figure 4:
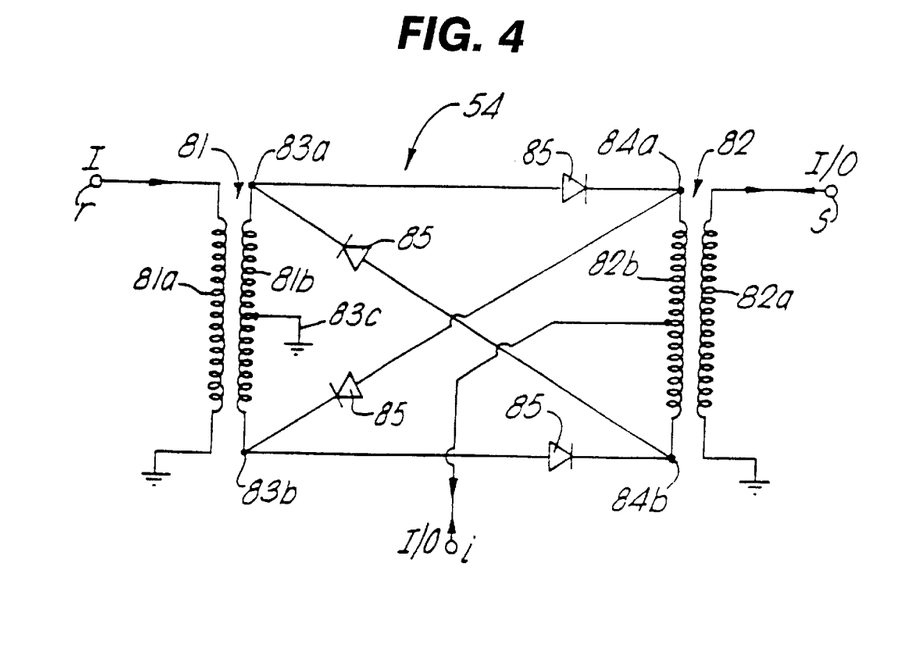
FIG. 4 is a schematic drawing of a reversible RF mixer for use in the module of FIGS. 2 and 3.

The circuit 40 provides signal processing for a phased array radar module without any requirement for an analogue RF phase shifter circuit in either reception or transmission. It dispenses entirely with this bulky and expensive component. Instead it employs digital signal synthesis for phase control in transmission and reception, together with computation for beamforming in reception. By avoiding the need for an RF phase shifter and using the same mixing and IR generating means in both reception and transmission, the number of RF elements in the circuit 40 is greatly reduced compared to the prior art. Referring now to FIG. 4, an RF mixer 54 of FIGS. 2 and 3 is shown in more detail The mixer 54 comprises first and second RF transformers 81, 82 having primary coils 81a, 82a and secondary coils 81b, 82b respectively. The secondary coils 81b, 82b have upper ends 83a, 84a and lower ends 83b, 84b respectively. Each of the secondary coil ends is connected to both ends of the other secondary coil via respective diodes 85 of opposite polarity; eg the upper secondary coil end 83a of the first RF transformer 81 is connected by diodes 85 polarised away from and towards it to upper and lower secondary coil ends 84a and 84b respectively of the second RF transformer 82.

The first transformer's primary coil 81a is connected between earth and the mixer reference signal input r. Its secondary coil 81b has a central connection 83c to earth. The second transformer's secondary coil 82b has a centre tap connection 84c to the mixer's IF input/output port i. Its primary coil 82a is connected between earth and the mixer's RF signal input/output port s.

In transmission mode, a reference signal input at r is coupled to the diodes 85 by the first RF transformer 81. An IF signal input at i is connected to the diodes 85 via the second transformer's primary coil and is mixed with the reference signal by the diodes. Mixing product frequencies $f_{LO}+f_{IF}$ and $f_{LO}-f_{IF}$ (as previously defined) are developed in the second transformer's primary coil 82b and coupled to the RF input/output port s for transfer to the RF splitter/combiner 52 (not shown) as described earlier.

In reception mode, the mixer 54 acts in reverse. The RF input/output port s now receives an RF signal. This is coupled to the diodes 85 by the second transformer 82, and is mixed with the reference signal to generate an IF signal for output at the IF input/output port i. In this mode, the primary and secondary roles of the coils 82a and 82b of the second transformer 82 are exchanged.

The mixer 54 is a well known, commercially available device. It is a reversible device as has been said, in that it acts as an upconverter in one (transmission) direction and as a downconverter in the other (receive) direction. It should be noted that this is not a universal property of all mixer circuits. Non-reversible mixers exist which are based on amplifiers (eg field effect transistors).

Figure 5:
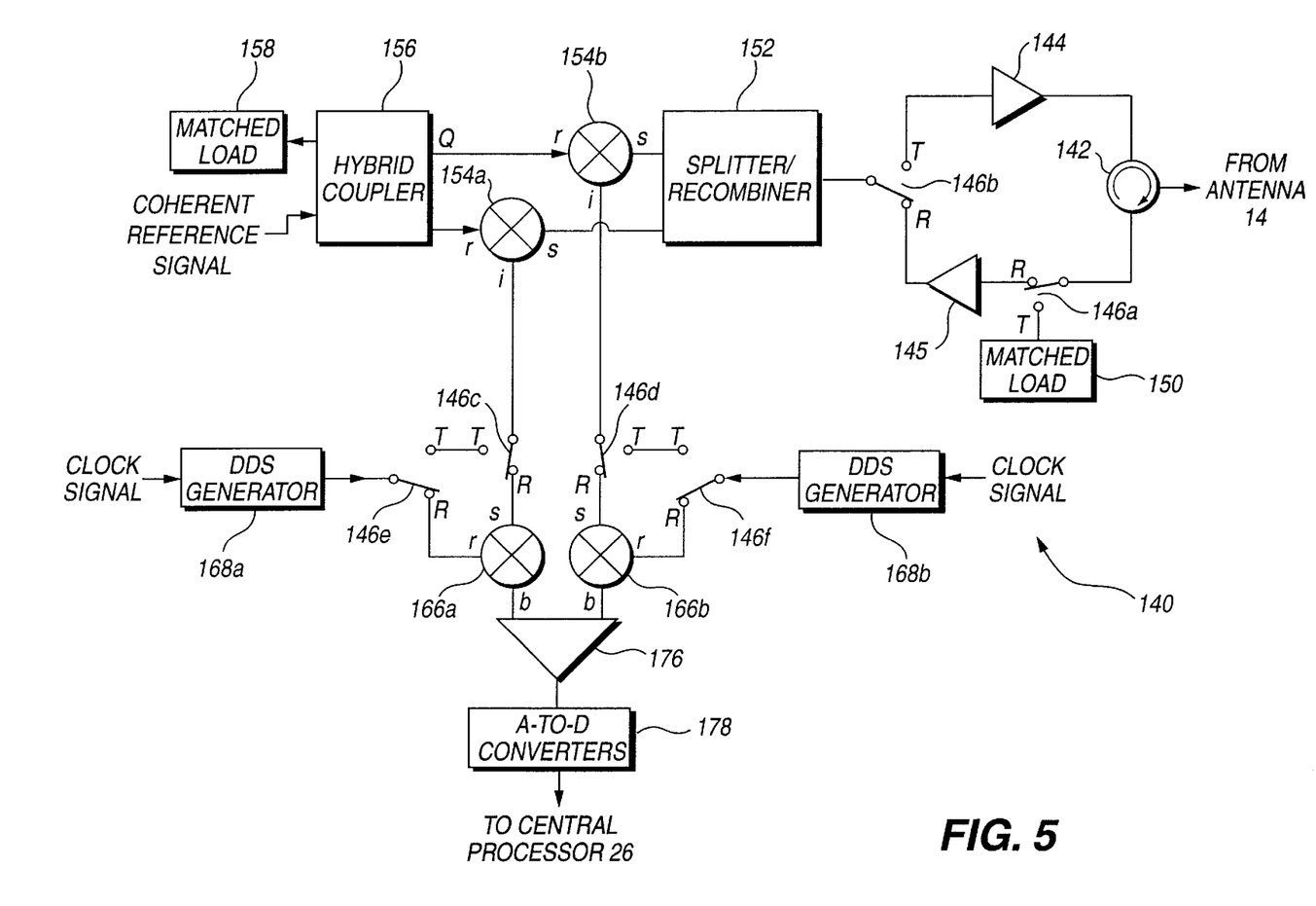
FIGS. 5 and 6 schematically illustrate alternative phased array circuit modules of the invention.

Referring now to FIG. 5, there is shown an alternative form of phased array module circuit 140 of the invention. It is equivalent to the circuit 40 of FIGS. 2 and 3 with some elements removed or replaced by other devices to be described. Parts equivalent to those previously mentioned are like-referenced with a prefix 100. The description of the circuit 140 will be directed largely to aspects of difference as compared to the earlier embodiment 40.

The circuit 140 has elements 142 to 168b arranged as their equivalents 42 to 68b, except that IF mixers 166a and 166b have signal inputs s connected directly to switches 146c and 146d respectively. These mixers have baseband outputs b connected as inputs to a summing amplifier 176, which is in turn connected to an ADC 178. Signals from the ADC 178 pass to the central processor 26 (now shown).

The circuit 140 operates in receive mode as follows. The switches 146a to 146f are all set to their R positions as illustrated. The DDS generators 168a and 168b are arranged to provide in-phase and quadrature IF reference signals respectively at a frequency $f_{IF}-f_o$. Here $f_{IF}$ is the intermediate frequency upconverted by RF mixers 154a and 154b in transmission mode, and $f_o$ is an offset frequency arranged to be a little greater than half the radar transmission bandwidth. The amplifier 176 sums the outputs of the IF mixers 166a and 166b. This results in subtraction of signals corresponding to antenna reception at one of the frequencies $f_{LO}\pm f_{IF}$ and addition of signals corresponding to reception at the other. Consequently, one of the radar frequency sidebands gives rise to a significant low frequency or baseband output from the amplifier 60, and the other is suppressed. Which of the radar frequencies $f_{LO}+f_{IF}$ and $f_{LO}-f_{IF}$ gives rise to baseband amplifier output and which does not is a matter of design choice arising from whether the quadrature IF reference signal leads or lags the in-phase equivalent by 90°.

The baseband output of amplifier 176 is in the frequency range 0 to $2f_o$, ie $f_o \pm f_o$. This is by virtue of the use of an IF reference signal frequency of $f_{IF}-f_o$ in IF mixers 166a and 166b. In consequence, a stationary (zero Doppler frequency) target gives rise to a baseband signal at $f_o$. Receding targets give signals in the range 0 to $f_o$, and approaching targets produce signals in the range $f_o$ to $2f_o$.

Baseband output signals from the amplifier 176 are digitised in the ADC 178 and fed to the central processor 26. The processor 26 carried out digital beamforming, Doppler processing and detection by computational techniques known to those skilled in the art of radar.

In transmission mode, the switches 146a to 146f are set to their T positions, i.e settings equivalent to those shown in FIG. 3. The DDS generators 168a and 168b are arranged to produce IF reference signals at the frequency $f_{IF}$, which is above that used in receive mode by an amount of $f_o$. As like elements in the circuit 40, the elements 152 to 158 act as a single sideband converter. They provide for one of the radar frequency sidebands $f_{LO}+f_{IF}$ or $f_{LO}-f_{IF}$ to be transmitted by the antenna 14 and for the other to be suppressed. Beamforming in transmission mode is carried out by the central processor 26 varying the IF reference signal phase from DDS generators 168a and 168b. The IF phase is varied as a function of the position of individual antennas 14 in the phased array.

Figure 6:
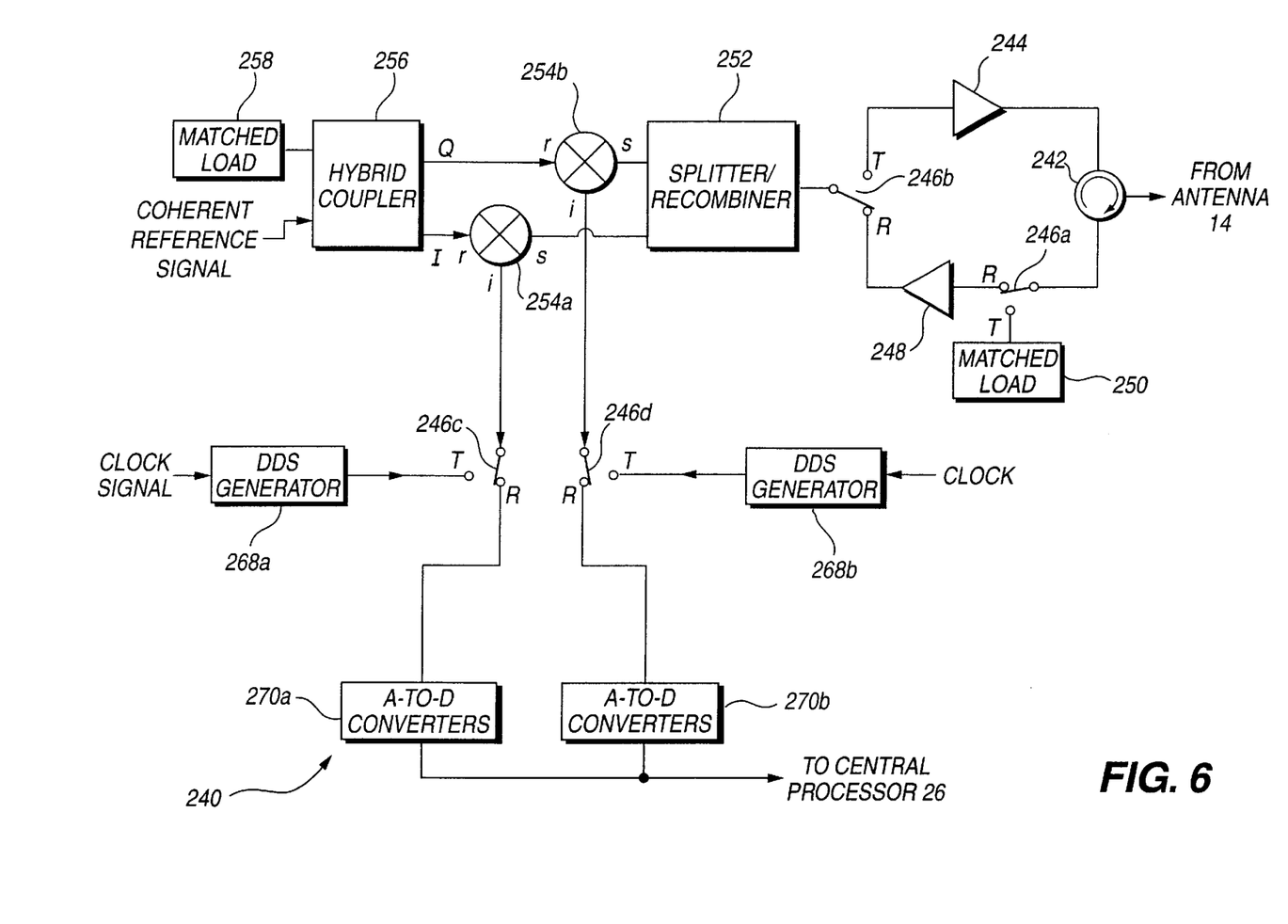

Referring now to FIG. 6, a further alternative circuit 240 of the invention is shown, this embodiment having simplified construction. Parts equivalent to those described in FIGS. 2 and 3 are like referenced with a prefix 200. The circuit 240 operates in transmission identically to that shown in FIGS. 2 and 3. It differs from the earlier embodiment 40 only in that there is no second frequency downconversion stage from IF to baseband in receive mode. In this mode, IF signals from RF mixers 254a and 254b are fed directly via switches 246c and 246d to ADCs 270a and 270b respectively. These ADCs consequently digitise IF signals directly, and the computational equivalent of frequency downconversion to baseband is carried out by the central processor 26 using digital algorithms. The circuit 240 is simpler than earlier embodiments, but requires faster ADCs 270a and 270b.

Figure 7:
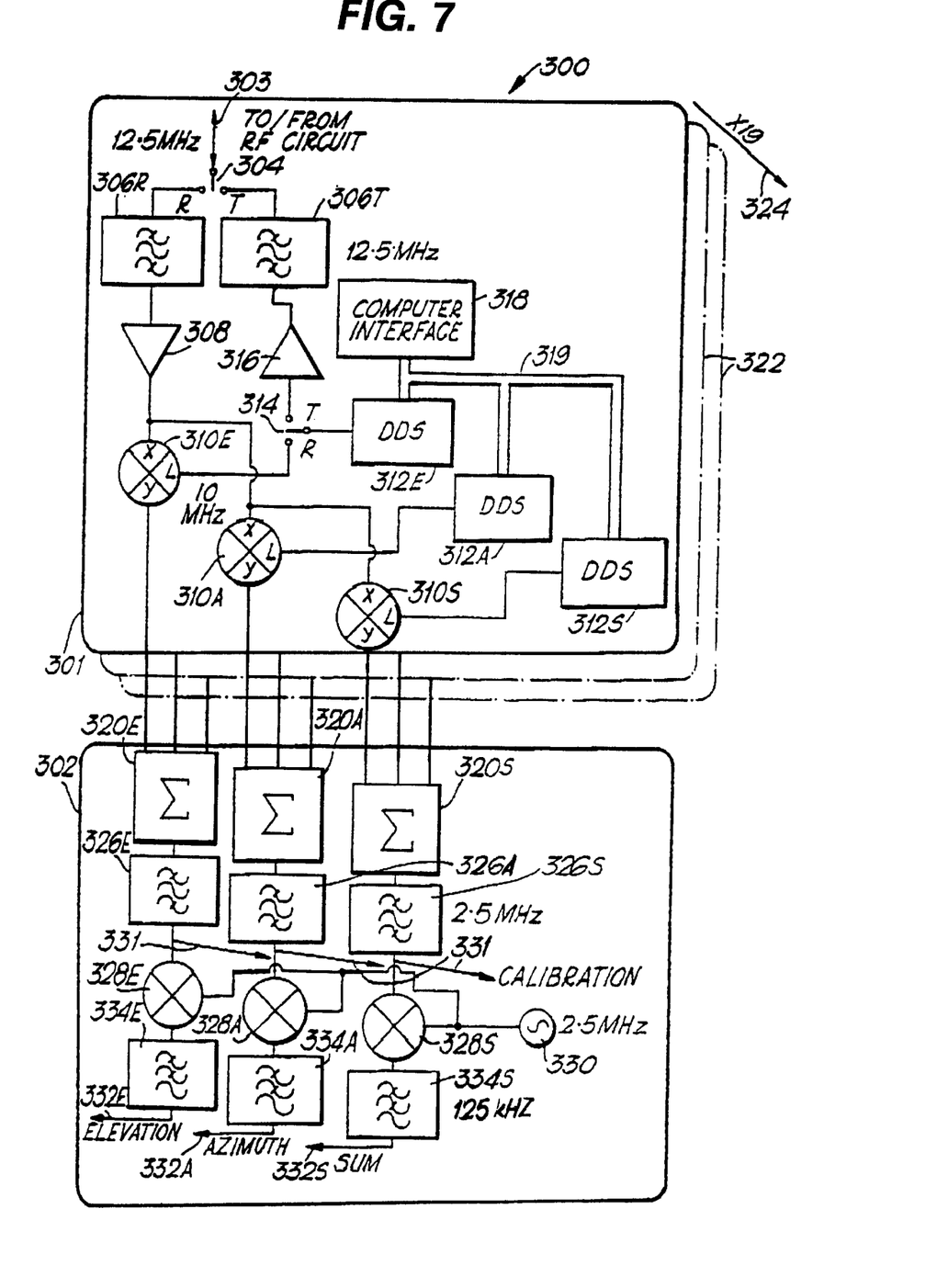
FIG. 7 is a circuit diagram of a module of the invention for configuring multiple beams together with analogue beamforming circuitry for use with an array of modules.

FIG. 7 shows a hybrid beamformer indicated generally by 300 incorporating intermediate frequency (IF) and low frequency (LF) circuit boards 301 and 302. The beamformer 300 incorporates an input/output (I/O) line 303 connected to a quadrature hybrid coupler (not shown) itself connected to two RF mixers (not shown). The coupler and RF mixers are associated with an antenna circuit and are connected in the same way as like elements 60, 54a and 54b in FIGS. 2 and 3. The I/O line 303 is connected to the pole of a first SPDT switch 304; this switch has transmit and receive throws T and R connected to 12.5 MHz bandpass filters 306T and 306R operative in transmission and reception respectively.

The receive filter 306R is connected to a low noise amplifier 308 and thence to signal inputs x of each of three IF mixers 310E, 310A and 310S, where the suffixes E, A and S indicate elevation, azimuth and sum respectively. The azimuth and sum mixers 310A and 310S have LO inputs L connected to direct digital synthesis (DDS) local oscillators 312A and 312S respectively which supply output signals having phase controlled by digital input signals.

The elevation mixer 310E has an LO input L connected to the receive throw R of a second SPDT switch 314; this switch has a transmit throw T connected to a power amplifier 316 and thence to the transmit filter 306T. It has a pole connected to an elevation DDS local oscillator 312F. Each of the local oscillators 312E, 312A and 312S is connected to a computer interface 318 by a bus 319. The interface 318 is connected to a computer (not shown), which provides digital phase control signals to the DDS local oscillators 312E, 312A and 312S.

The local oscillators 312E, 312A and 312S have low frequency (LF) outputs y connected to respective summers 320E, 320A and 320S on the LF board 302. The example shown in FIG. 7 is designed for a nineteen element phased array, and in consequence each of these summers receives a total of nineteen LF signal inputs from the IF board 301 and eighteen other equivalent IF boards indicated by dotted lines 322 and an arrow 324. Each IF board 301 or 322 is connected to a respective RF circuit and antenna as described earlier. The summers 320E, 320A and 320S have outputs connected via 2.5 MHz band pass filters 326E, 326A and 326S to respective baseband mixers 328E, 328A and 328S having a common 2.5 MHz local oscillator 330. The filters 326E etc are also connected to calibration outputs 331. The baseband mixers are connected to elevation, azimuth and sum outputs 332E, 332A and 332S via 125 KHz low pass filters 334E, 334A and 334S respectively.

The beamformer 300 operates as follows. In transmission mode the switches 304 and 314 are set to their transmit throws T; a 12.5 MHz digitally synthesised local oscillator signal passes through the amplifier 316 and transmit filter 306T to the I/O Line 303 from the elevation DDS local oscillator 312F under computer control via the interface 318. This signal has the correct phase to contribute to steering of the RF beam transmitted by the array of antennas (not shown) to which the IF boards 301 and 322 are connected. The signal passes through a quadrature hybrid coupler to the two RF mixers, and modulates an RF coherent reference signal for subsequent transmission from an antenna as described earlier with reference to FIG. 3.

In reception mode, the switches 304 and 314 are set to their receive throws R; a 12.5 MHz IF signal is produced in the RF circuit as described with reference to FIG. 2. It passes to the I/O line 303 and from this to the receive filter 306R and low noise amplifier 308. After filtering at 306R and amplification at 308, the IF signal is fed to each of the IF mixers 310E, 310A and 310S. Here it is mixed separately with three digitally synthesised local oscillator signals with appropriate phasing and amplitude weighting for difference elevation beamforming, difference azimuth beamforming and sum beamforming respectively. This provides three LF signals for output to respective summers 320E, 320A and 320S. Each of the other eighteen IF boards 322 also produces three LF signals in the same way. The summers 320E, 320A and 320S add elevation, azimuth or sum LF signals respectively from all nineteen circuit boards, and they provide output signals which pass to baseband mixers 328E, 328A and 328S through 2.5 MHz bandpass filters 326E, 326A and 326S respectively. The mixers 328E, 328A and 328S generate baseband output signals which are filtered by the 125 KHz low pass filters 332E, 332A and 332S before passing to the elevation, azimuth and sum outputs 332E, 332A and 332S respectively.

Beamforming is carried out with the aid of a computer connected to the interface 318 on each of the IF boards 301 and 322. The computer controls all fifty-seven DDS local oscillators (three per IF board, eg 312E, 312A, 312S) to provide IF phase angles appropriate to configure three output beams from the phased array comprising the RF antennas to which the IF boards 301 and 322 are connected. For example, to configure a difference elevation beam, the nineteen elevation DDS local oscillators such as 312E provide respective IF phase angles such that the phased array has a sensitivity null on the array boresight and sensitivity maxima adjacent to boresight. This provides for a target to give a zero radar return when on boresight and to change to non-zero when moving off boresight in the vertical dimension. A similar beam is formed in the azimuth (horizontal) dimension. The sum output 332S provides a maximum radar return for targets on boresight. If more beam are required, the boards 301, 302 and 322 may be provided with additional local oscillators, mixers, summers, etc. The sets of elements suffixed E, A and S define elevation, azimuth and sum channels to which further channels may be added. The hybrid beamformer 300 is a combination of digital IF local oscillators with analogue LF and baseband circuitry. This has the advantage that high speed (10 MHz) analogue to digital converters for digitising signals are not required. Furthermore, the beamformer is capable of greater phase accuracy than a conventional RF switched phased shifter; 8 bit resolution in phase angle (1.4°) is easily obtainable, and 16 bit resolution is feasible. A conventional switched phase shifter is capable of 5 or 6 bit resolution, the limit being set by RF analogue circuit constraints. The beamformer 300 is also characterised by relatively low space requirements and low cost, silicon VLSI being employed.

Figure 8:
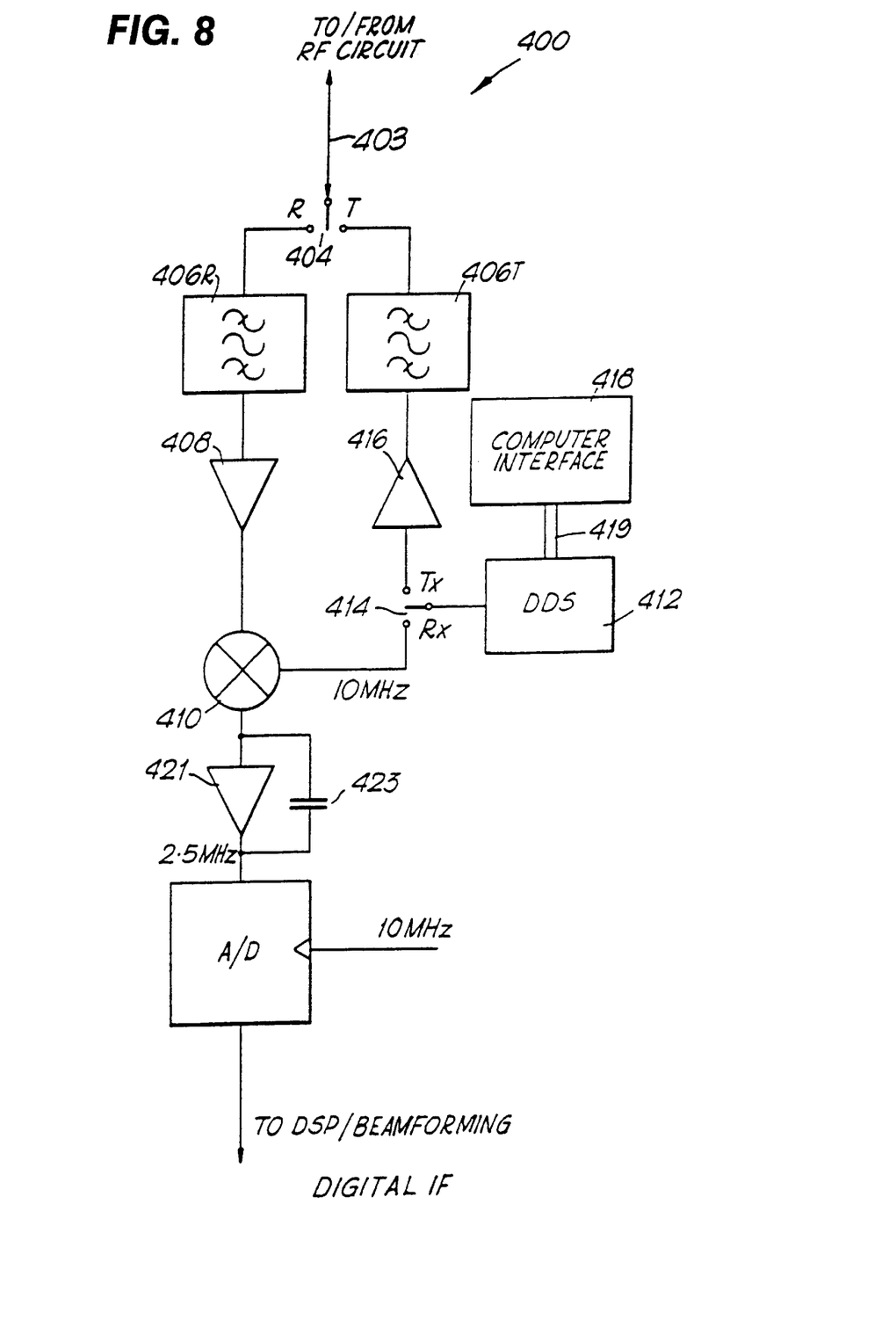
FIG. 8 is a circuit diagram of a module of the invention using digital beamforming circuitry.

Referring now to FIG. 8, there is shown a further embodiment of a circuit of the invention indicated generally by 400; it implements a digital beamformer for use in receive mode; elements equivalent to those shown in FIG. 7 are ike referenced with 400 replacing the 300 prefix and without suffixes E, A or S. These elements, referenced 403 to 419, are connected and operate as described in relation to those of elements 303 to 319 associated with the elevation channel. Their configuration and operation will therefore not be described.

The circuit 400 operates in transmission as described with reference to FIG. 7. In reception, 2.5 MHz output IF signals from an IF mixer 410 pass to an amplifier 421 shunted by a capacitor 423, and thence to an analogue to digital (A/D) converter 425. The mixer output signal is sampled at 10 MHz by the AD converter 425. The latter digitises the full radar pulse spectrum, which has 4 MHz bandwidth.

Digital signals output from the A/D converter pass to digital processing circuitry (not shown) for beamforming in a manner known to those skilled in the art.

Each RF module (see FIG. 1) of a phased array is associated with a respective circuit 400, and so an array of nineteen antennas for example would require nineteen such circuits.

Figure 9:
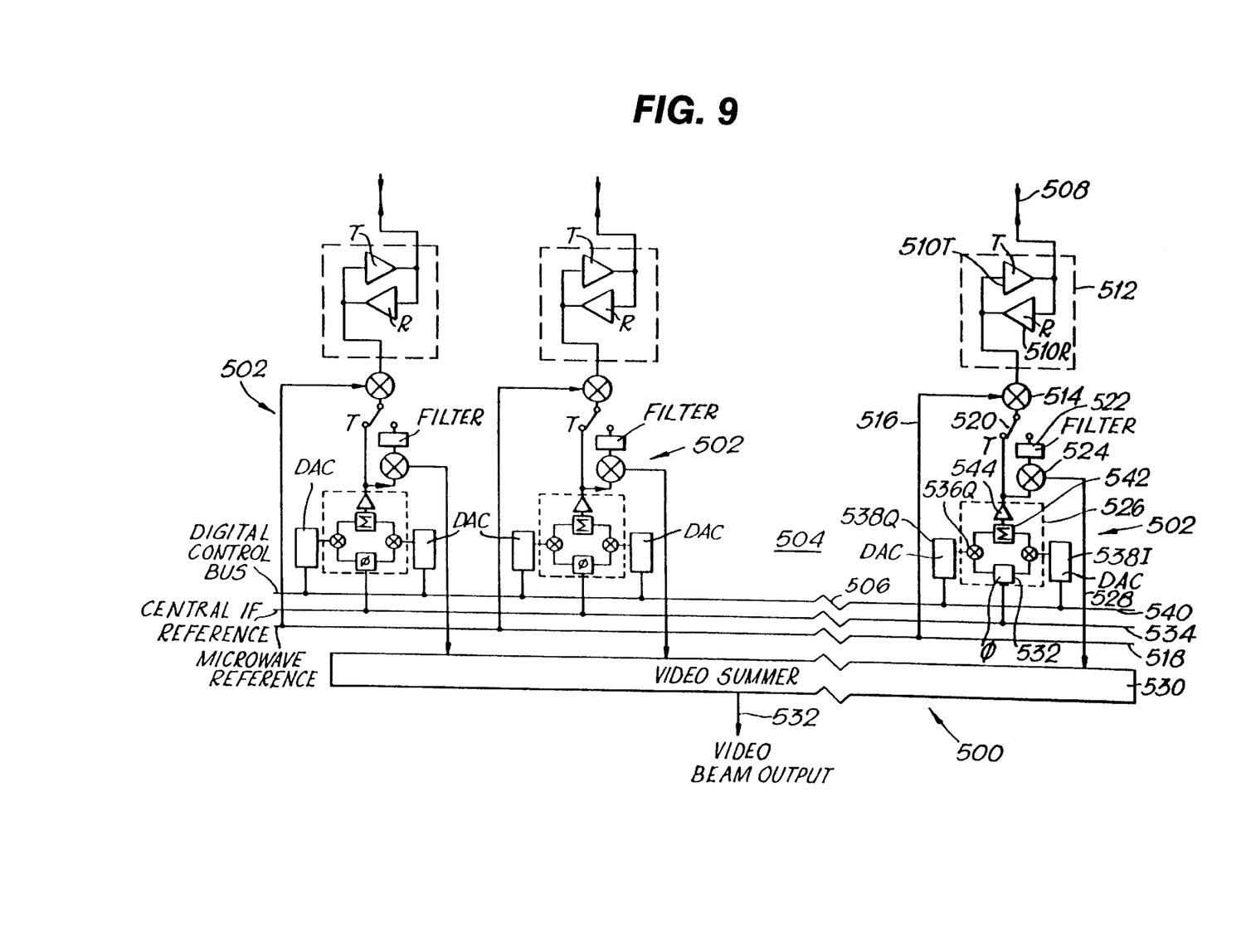
FIG. 9 schematically illustrates circuit modules of the invention for receive/transmit operation and incorporating silicon vector modulators for signal phase control.

Referring now to FIG. 9, there is schematically shown an IF beamforming system indicated generally by 500 designed for low-cost production. The system 500 consists of a number of beamforming circuits 502 of like construction. The arbitrary nature of the number of circuits 502 is indicated by a space 504 and discontinuities such as 506. One of the circuits 502 will now be described, others being equivalent. The circuit 502 incorporates a radar antenna 508 connected to transmit and receive amplifiers 510T and 510R, which are in a parallel arrangement with the output of each connected to the input of the other. This pair of amplifiers are formed as a monolithic microwave integrated circuit (MMIC) chip indicated by chain lines 512. They incorporate GaAs FETs. When one of the amplifiers is in operation the other is disabled by appropriate biasing.

The MMIC chip 512 is connected to an RF mixer 514 having a local oscillator input feed 516 linked to a microwave (RF) reference signal supply line 518 common to all circuits 502. The RF mixer 514 is connected to a pole of an SPTDT switch 520 having transmit and receive throws T and R. The receive throw R is connected through an IF bandpass filter 522 to an IF mixer 524, which receives a local oscillator input signal from a silicon bipolar vector modulator chip or integrated circuit 526 indicated within dotted lines. The modulator chip 526 is of the kind incorporated in commercial communications products. The IF mixer 524 provides baseband output signals on a line 528 connected to a video summers 530 with a sum output 532 and common to all circuits 502.

The modulator chip 526 incorporates a 90° power splitter 532 connected to a common central IF reference signal line 534 and to in-phase and quadrature mixers 536I and 536Q. These mixers are matched Gilbert cell devices which are essentially linear multipliers. They are connected to respective digital to analogue converters (DACs) 538I and 538Q, both of which are in turn connected to a digital control bus 540 linked to a computer (not shown) and common to all circuits 502. The DACs 538I and 538I incorporate digital circuitry for address decoding and memory for storing a digital number. The mixers 536I and 536Q provide output signals to a summer 542, from which a sum output passes via an amplifier 544 to the transmit throw T of the switch 520 and also to the IF mixer 524 as a local oscillator input.

The circuit 502 operates in transmission as follows. The switch 520 is set to the transmit throw T. The computer provides successive digital signals on the control bus 540. These signals each consist of an individual DAC address together with a digital number for phase control to be stored in the memory of the relevant DAC 538I or 538Q associated with that address. When addressed by the control bus 540, a DAC stores the associated digital number and converts it to an analogue voltage for input to mixer 536I or 536Q. Each DAC is addressed in turn to furnish it with a respective phase control number. The signal line 534 delivers an IF reference signal to the power splitter 532, which converts it to two signals with a 90° phase difference (in-phase and quadrature components) for input to the mixers 538I and 538Q respectively. Each of these mixers supplies the product of its analogue input voltage and reference input signal to the summer 542.

In consequence, the summer 542 receives two input signals of the same frequency, 90° phase difference and with amplitudes weighted in accordance with signals on the control bus 540. The summer output is therefore a signal at the IF reference frequency on the line 534 with phase controlled by the digital control bus signals; ie if the IF reference angular frequency is $\omega$, then the summer output signal $S_o$ is given by:

$$S_o = A \sin\omega t + B \sin(\omega t + \pi/2)$$

$$S_o = (A^2 + B^2)^{1/2} \sin(\omega t + \tan^{-1} B/A)$$

where A and B are the magnitudes of the voltages from the DACs 538I and 538Q.

The summer output is therefore of constant amplitude $(A^2+B^2)$, and has a phase angle of $\tan^{-1} B/A$ which is a function of the ratio of the digital signals supplied by the control bus 540. The digital signals thus provide control of the phase of the summer output signal. which passes to the RF mixer 514 for mixing with the microwave reference signal on the line 518 to provide phase control.

The RF mixer output is an RF signal with prearranged phase, and it passes to the transmit amplifier 510T for amplification and then to the antenna 508 for transmission. The receive amplifier 510R is switched off. Beamforming of the transmitted beam arising from all antennas 508 is achieved by appropriate digital signals on the control bus 540 which control the phases of the antenna output signals.

The circuit 502 operates in reception as follows. The receive and transmit amplifiers 510R and 510T are biased on and off respectively, and the switch 520 is set to its receive throw R. An RF radar return signal received at the antenna 508 is amplified by the receive amplifier 510R and downconverted to intermediate frequency by the RF mixer 514. It is then filtered by the bandpass filter 522 centred at IF, and mixed with the output signal of the summer 542 by the IF mixer 524. As has been said, the output of the summer 542 is a signal at IF with phase controlled by signals on the control bus 540. The IF mixer 524 therefore mixes a variable phase local oscillator signal with the IF radar return signal to provide a signal with controlled phase, as required for beamforming in reception. The controlled phase signal may be at baseband frequency, alternaltively, it may be at video frequency if the IF reference frequency is appropriately offset. The baseband signal passes from the IF mixer to 524 to the video summer 530, where it is summed with like signals from other circuits to provide an output beam signal at video frequency. The output beam signal is processed by conventions radar signal processing circuitry (not shown) to provide a radar display. Such circuitry is well-known is the art of radar and will not be described.

The beamforming system 500 is inexpensive to construct because it is based on GaAs MMIC RF amplifiers and a silicon bipolar MMIC vector modulator chip 526. Such modulator chips are manufactured for cellular telephone systems and transmitters for local area networks, and are available for less than $10. The video summer is conventional television system technology. Moreover, the system 500 is capable of surprisingly high accuracy despite its cheapness. In this regard, the quality of beamforming in both transmit and receive is largely dependent on the phase accuracy of the variable phase IF signal produced as the output of the summer 542 in the modulator chip 526. Tests on one such chip showed that measured IF signal phase was within 4° of the corresponding intended phase value calculated from the analogue voltages input to the mixers 536I and 536Q. Moreover, the error between the measured and calculated phase was found to be repeatable to very much less than 4°; it is therefore susceptible to reduction by calibration of the system 500 to associate obtained IF phase angles from each modulator chip 526 with digital phase control signals on the control bus 540 giving rise to them. Precalibrated control signals giving rise to specific phase angles required for a range of radar beams may be stored in a look-up table memory and read out for input to the control bus 540 as necessary.

Figure 10:
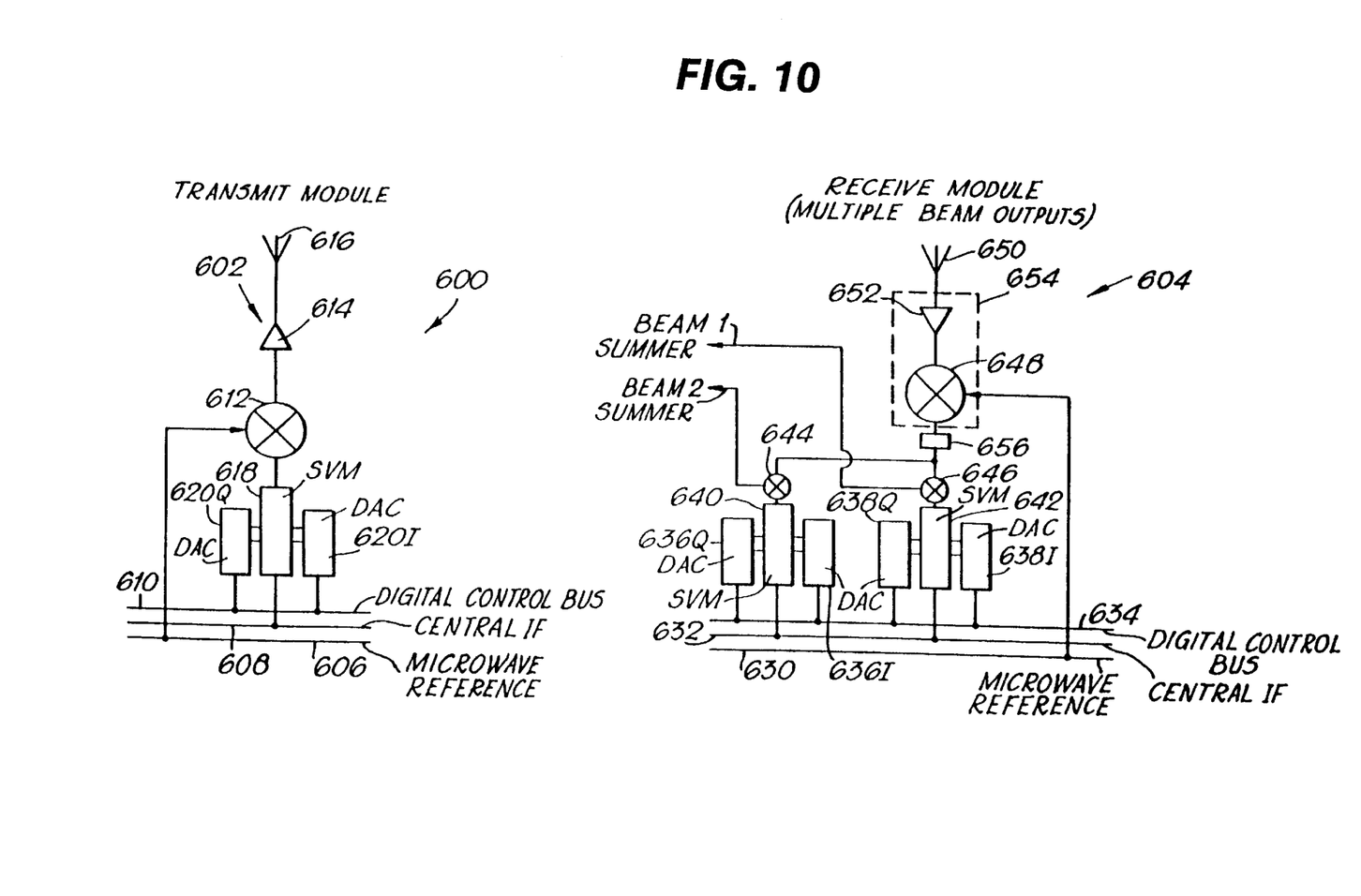
FIG. 10 schematically illustrates separate receiver and transmitter modules of the invention incorporating silicon vector modulators for signal phase control the receiver module including an integrated circuit for RF downconversion.

Referring now to FIG. 10, there is shown another radar beamforming system 600, of the invention also designed for low cost production. The system 600 has parts equivalent to those described with reference to FIG. 9, and it also incorporates elements described earlier. The following description will concentrate on aspects of difference between this and earlier embodiments.

The beamforming system 600 incorporates a transmit module 602 and a separate receive module 604. The transmit module 602 incorporates a microwave reference line 606, a central IF line 608 and a digital control bus 610. The microwave reference line 606 is connected to a single side band upconverter 612 itself connected to a power amplifier 614 for RF signal delivery to an antenna 616.

The central IF line 608 and the digital control bus 610 are connected respectively to a silicon vector modulator chip 618 and to DACs 620I and 620Q providing analogue voltages to that chip. The upconverter 612 receives an IF reference signal from the modulator chip 618 for phase control purposes. The transmit module 602 operates equivalently to the system 500 described with reference to FIG. 9 when configured for transmission, and will not be described further.

The receive module 604 incorporates a microwave reference line 630, a central IF line 632 and a digital control bus 632. The control bus 632 is connected to two pairs of DACs 636I/636Q and 638I/638Q, which supply analogue voltages to respective silicon vector modulator chips 640 and 642. The chips 640 and 642 receive IF signals from the line 632 and provide phase controlled IF reference signals to respective IF mixers 644 and 646.

The microwave reference line 630 is connected to provide a local oscillator input to an RF image rejection mixer 648, which is also connected to receive radar return signals from an antenna 650 after amplification by a low noise amplifier 652. The RF mixer 648 and amplifier 652 are incorporated in a single microwave receiver chip 654 (indicated within chain lines) of the kind used in direct broadcast satellite television receivers and commercially available as an MMIC single chip.

IF signals are produced in the RF mixer 648 from down-conversion of radar returns, and these pass through an IF bandpass filter 656 to both of the IF mixers 644 and 646. The IF mixers produce video frequency or baseband signals with phases controlled by digital signals on the control bus 634 as described earlier in relation to FIG. 9. The frequency of these video frequency or baseband signals may be controlled by offsetting the central IFs of the receive section 604 and the transmit section 602.

The baseband or video signals pass from the IF mixers 644 and 646 to outputs 658 and 660 respectively, each of which is connected to a summer (not shown) equivalent to element 530 of FIG. 9. As described earlier in relation to FIG. 7, each summer adds the signals associated with its beam (1 or 2) from all receive modules. Because there are two sets of circuit elements 636I to 646 for IF phase control, two beams are formed, and more beams would be obtainable if additional phase control circuits were employed. Each summer therefore provides a respective configured output beam signal.

A phased array radar based on the modules 602 and 604 incorporates separate arrays of transmit and receive modules. The receive array is extremely inexpensive because its major items are two commercially available integrated circuits or chips 642 and 654. The use of the modulator chip 618 in the transmit array contributes to the relative cheapness of the latter.

What is claimed is:

1. A circuit module for a phased array for digitally controlling the phase of a received signal, the module including:
   (a) digital to analogue converters for converting digital phase-control signals into analogue phase-control signals;
   (b) a vector modulator integrated circuit for:
      (i) receiving input of an analogue reference signal and the analogue phase-control signals and producing therefrom two derived signals which are phase-shifted and amplitude weighted relative to one another, and
      (ii) combining the derived signals to produce a digitally phase-controlled signal; and
   (c) a mixer for mixing the received signal with the digitally phase-controlled signal to produce a digitally phase-controlled received signal.

2. A circuit module for a phased array for digitally controlling the phase of a signal for transmission, the module including:
   (a) digital to analogue converters for converting digital phase-control signals into analogue phase control signals; and
   (b) a vector modulator integrated circuit for:
      (i) receiving input of an analogue reference signal and the analogue phase control signals and producing therefrom two derived signals which are phase-shifted and amplitude weighted relative to one another, and
      (ii) combining the derived signals to produce a digitally phase-controlled transmission signal.

* * * * *